United States Patent [19]

Millet

[11] Patent Number: 4,757,187
[45] Date of Patent: Jul. 12, 1988

[54] METHOD FOR MARKING PRODUCTS IN RELATION WITH AN ORGANIZATION WHICH IS COMMISSIONED TO CHECK THIS MARKING

[75] Inventor: Jean-Claude Millet, Bourg Les Valence, France

[73] Assignee: Imaje, S.A., Bourg Les Valence, France

[21] Appl. No.: 840,579

[22] PCT Filed: May 28, 1985

[86] PCT No.: PCT/FR85/00132

§ 371 Date: Jan. 28, 1986

§ 102(e) Date: Jan. 28, 1986

[87] PCT Pub. No.: WO85/05714

PCT Pub. Date: Dec. 19, 1985

[30] Foreign Application Priority Data

May 29, 1984 [FR] France ............................ 84 08629

[51] Int. Cl.$^4$ .............................................. G06F 15/12
[52] U.S. Cl. ................................... 235/432; 235/385; 364/409; 364/466
[58] Field of Search .......................... 235/385, 432; 340/825.31; 364/403, 409, 464, 466

[56] References Cited

U.S. PATENT DOCUMENTS

| | | |
|---|---|---|
| 3,348,030 | 10/1967 | Krause . |
| 3,611,293 | 10/1971 | Constable et al. ............ 340/825.31 |
| 3,651,478 | 3/1972 | Shandlay . |
| 4,024,380 | 5/1977 | Gunn ................................ 235/432 |
| 4,191,376 | 3/1980 | Goldman et al. .................. 235/385 |
| 4,226,360 | 10/1980 | Simjian . |
| 4,258,252 | 3/1981 | Simjian ............................. 235/432 |
| 4,424,573 | 1/1984 | Eckert et al. ................. 364/409 X |
| 4,466,079 | 8/1984 | Daniels et al. .................... 364/466 |
| 4,529,871 | 7/1985 | Davidson ..................... 235/385 X |
| 4,649,266 | 3/1987 | Eckert .............................. 235/432 |

FOREIGN PATENT DOCUMENTS

| | | |
|---|---|---|
| 948591 | 6/1974 | Canada . |
| 97110 | 12/1983 | European Pat. Off. . |
| 2139208 | 1/1973 | France . |
| 2181409 | 11/1973 | France . |
| 2358704 | 2/1978 | France . |
| 2401465 | 3/1979 | France . |
| 2450011 | 9/1980 | France . |
| 80/02757 | 12/1980 | PCT Int'l Appl. . |
| 81/00476 | 2/1981 | PCT Int'l Appl. . |
| 1257163 | 12/1971 | United Kingdom . |
| 2134679 | 8/1984 | United Kingdom . |

OTHER PUBLICATIONS

Lakhani and Wood; "A New Dimension in Data Capture"; *Systems Technology* Sep. 15, 1972 pp. 9–12.

*Primary Examiner*—David L. Trafton
*Attorney, Agent, or Firm*—Roland Plottel

[57] ABSTRACT

The invention relates to a method for marking products in relation with an organization commissioned to check this marking both from the point of view of authenticity of the printed message and from the point of view of the number of these messages which have actually been printed. The printer (A) connected to the packaging chain (C) receives the control instructions either directly from a terminal (B) located in the premises of the checking organization or by means of a memory card programmed by this organization and supplied by this latter to the user. Recording of the number of messages is carried out either directly at the level of the terminal (B) on the premises of the checking party or by means of the memory card which contains a predetermined number of messages. When the card has been utilized, the user acquires another card. The invention applies in particular to checking of affixing of inland revenue stamps and makes it possible to guard against fraud in an effective manner.

7 Claims, 1 Drawing Sheet

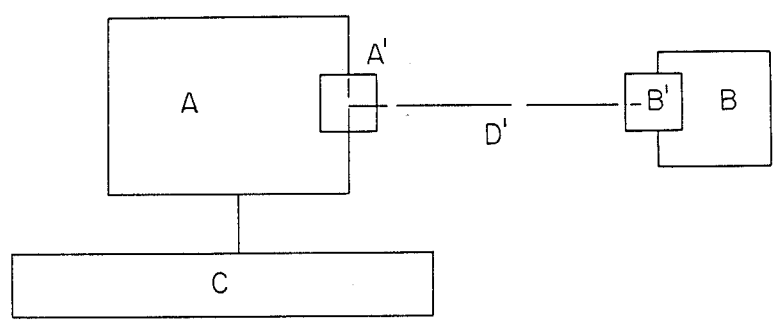

METHOD FOR MARKING PRODUCTS IN RELATION WITH AN ORGANIZATION WHICH IS COMMISSIONED TO CHECK THIS MARKING

The invention relates to a method for marking products in relation with an organization which is commissioned to check this marking.

There exist a certain number of applications in which checking of a quantity of packaged objects has to be controlled with strict accuracy. This is the case in particular with products which are subject to a government tax such as tobacco and alcohol. In this case, specific marking must be performed on each product which is sold commercially. For example, in the case of government taxation of alcoholic beverages, a graphic sign bearing the effigy of Marianne and various accessory identification marks are applied on each bottle capsule.

A number of constraints are associated with this requirement:

constraints imposed specifically on the person who performs the checking operation.

constraints imposed specifically on the user.

In the case of the government administration or any organization which has a right of inspection, it is necessary above all to prevent fraud and the use has to avoid storage of packages which bear an inland revenue stamp, for example, which results in immobilization of considerable sums without taking into account the risks of fraudulent misappropriations of these stocks.

The invention has for its object to overcome these disadvantages and relates to a method which is intended to remove both the risks of fraud with respect to the government administration or any other authority which has a right of inspection of the product and the storage constraints imposed on users.

The invention is more precisely concerned with a method for marking products in relation with an organization commissioned to check this marking both in regard to authenticity of the inscribed message and in regard to the number of marked products; characterized in that it consists in controlling a printer (A) from a terminal (B) for delivering control instructions which are put under the direct control of said organization and result in printing of a predetermined message.

BRIEF DESCRIPTION OF THE DRAWING

A better understanding of the invention will be gained from the following explanations and from the single accompanying FIGURE which illustrates diagrammatically the combination of means for the practical application of the method in accordance with the invention.

The method in accordance with the invention essentially consists in connecting the printer having the function of inscribing a graphic sign representing a code to a checking and control device put under the supervision of the organization commissioned to check and select this inscription, the function of which is on the one hand to permit this inscription and on the other hand to record the number of inscriptions actually made. It also consists in connecting the printer to the packaging chain in order to perform the inscription when the checking and control device subsequently gives the signal to do so.

Such a method is illustrated by means of the FIGURE A plurality of subassemblies cooperate with each other in the manner described below. In the first place, an assembly (A) is constituted by a printer provided with interface means (A′) which connects it through a line (D) and an interface (B′) to assembly (B) which constitutes the checking and control peripheral already referred-to earlier. Finally, the assembly (A) is connected to the unit (C) for packaging the products which are to be provided with a marking such as, for example, an inland revenue stamp.

In accordance with the invention, the assembly (B) is put under the direct authority of the party which is invested with a right of inspection, namely the government taxation department in the example chosen, whilst the combination of the subassemblies (A) and (C) which can be provided in any number and is put directly under the user's supervision, this user being defined here as the party who affixes the distinctive sign, namely in this case the inland revenue stamp.

The subassembly (A) is for example constructed around an ink-jet printer of the multinozzle type permitting the application of a graphic sign formed by means of the successive application of (n) columns of (x) dots designated as patterns. The choice of a printer of this type or of any equivalent means is fundamental for the application of the method since the graphic sign must in fact be formed from elementary subassemblies such as dots, for example.

In accordance with an important characteristic feature of the invention, this printer operates preferentially in the graphic mode and only the pattern generation functions are performed at the level of the printer, the pattern storage function and/or the graphic sign generating function being transferred to the level of the terminal (B). The printer has the possibility of operating in the local mode as will be explained hereinafter but only on a limited number of graphic signs. A second essential function of this terminal (B) is the keeping of an accounting record of the inland revenue stamps which have been affixed. It also ensures control management of the various graphic signs.

The method in accordance with the invention is carried out in the manner described hereunder.

Two cases are to be considered. On the one hand checking of correct operation of the printer without involving any counting operation on the part of the inspecting organization. On the other hand, intervention of this organization when this first step proves conclusive. To this end, in a first stage, the user puts the printer into service: he has the task of making sure that his device operates without any problem. To this end, he executes a program referred-to as a "test" program and checks whether all the functions can be correctly performed. During this stage of operation, the connection between the assembly (A) (printer) and the terminal (B) controlled by the organization concerned is interrupted. Therefore the graphic taxation sign in the example chosen by way of illustration is not liable to be entered in an accounting record at the user's expense. In consequence, no accounting at the level of the centralizing (inspecting) organization can take place. The subassemblies (A) and (B) are disconnected.

Under these conditions, the user can therefore check and make sure that everything takes place correctly. He then carries out encryption of the legible contents of the message by making use of conventional alphanumeric characters and conventional message elements such as for example: date, hour, minute, second . . . of production or else the number of the marked package. The user can employ the combination of these items of information and print them either wholly or partly in clear and/or in bar code. The items of information thus written can if necessary be read later and compared with the algorithmic data generated by the checking and control element (B). Apart from encryption of the legible contents of the message, the user can also carry out encryption of the graphic sign. On the basis of an algorithmic method, he can in fact alter certain patterns of the graphic sign by addition, coalescence or elimination of certain dots. In this respect, the ink-jet writing technique is particularly suited to these combination.

When this test stage has been completed and all the functions prove to have been correctly performed, the user then considers that he can put into operation the terminal (B) which is controlled and checked by the supervising organization and which accordingly has the allotted task of keeping an account of these actions. He then intentionally establishes a communication with this terminal (B). He then obtains issuance of the "inland revenue stamps", that is to say of the signals for controlling his printer (A) which then forms the graphic sign concerned in accordance with the program which has previously been stored in memory. This step bears witness to the fact that he has paid or will pay the taxes relating to each product which has been marked. The connection between the printer (A) and the packaging chain (C) corresponds to this operation of issuance of the "revenue stamp" in a concomitant manner. On each marked object, there is accordingly written a means of proof which is also entered in an accounting record at the level of the organization which checks its distribution.

Thereupon, when this programmed operation stops, the disconnection between the printer (A) and the terminal (B) takes place, which automatically produces at the level of the printer the loss of the memory containing the items of information which relate to printing of the inland revenue stamp. The printer stops.

A method of this type enables the user to economize unnecessary stocks and to avoid becoming the owner of surplus inland revenue stamps which are liable to be stolen or which in any case constitute a useless investment for the user.

A method of this type also has a great advantage in that it can be utilized when the shape or appearance of the product to be marked does not make it possible to affix inland revenue marks by means of conventional methods.

Under these conditions, the user does not have to keep inland revenue stamps in his possession for too long periods of time before they are commercialized. Similarly, the taxation departments (in the example chosen in order to illustrate the invention) have the assurance that they will recover the funds which are due to them. This being established, in accordance with another important feature of the invention, the organization which is empowered to control the marketing of the products concerned is provided with means for preventing any fraud. In fact, it has at its disposal the terminal (B) from which it can check all the information contained in the "inland revenue stamp" to be printed by the organization by delivering the corresponding control signals. It can therefore program this information according to choice. For example, if it is considered that this information is defined by coordinates (x y), it can program the information chosen in the case of each of these coordinates and in a wholly arbitrary manner with respect to the user. Thus it can add a dot in a predetermined zone of the inland revenue stamp, the position of this dot being for example related to the number of the user (packager) at the minute and at the second of packaging. This is a parameter which can be modified in a random manner known only to the organization but which, in respect of this latter, remains characteristic of the user.

The connection between the printer (A) and the terminal (B) can be established by conventional telecommunication means. In this case, the terminal (B) is located in the premises of the checking organization, for example the premises of the tax inspection department. In order to obtain delivery of the signal which will initiate the printing sequence and the operation of his printer (A), the user will then have to present his personal code. This connection can also be obtained by means of a memory card delivered by the checking organization and the terminal (B) will then be installed in the user's premises. Each memory card initially personalized by the principal will accordingly comprise a certain number of inland revenue stamps which will be counted at the user's end as they are utilized.

Such a method in accordance with the invention lends itself to numerous applications. Tax applications have been described at greater length but it could also be employed by enfranchizers or licensors for checking the number of articles commercialized in particular under their trademark.

What is claimed is:

1. Method for marking products at a user's location in relation with an organization commissioned to check this marking both in regard to authenticity of the inscribed message and in regard to the number of marked products, characterized in that it consists in controlling a printer (A) at a user's location from a terminal (B) at the organization's location which delivers control instructions which are under the continuous direct control of said organization and result in printing of a predetermined message, this printed message being arbitrarily variable by said organization and its contents being derived from an encryption algorithm such that dots constituting the message are added or removed as a function of this algorithm which therefore ensures its authenticity.

2. Method of marking in accordance with claim 1, characterized in that this algorithm is a function in particular of the number of the marked package and of the hour, minute, second of marking.

3. Method of marking in accordance with claim 1, characterized in that this message is an inland revenue stamp.

4. Method in accordance with claim 1, characterized in that accounting means enable said organization to count the number of messages delivered.

5. Method in accordance with claim 1, characterized in that the control instructions are delivered from a terminal (B) located in the premises of said organization.

6. Method in accordance with claim 1, characterized in that the control instructions are stored in a memory card containing a predetermined quantity of messages and supplied to the user by said organization, the terminal (B) for controlling the printer being in that case located in the user's premises.

7. Method in accordance with claim 1, characterized in that, outside the steps of connection of the printer with the terminal (B), the printer (A) can operate independently and reply to so-called "test" programs.

* * * * *